United States Patent
Weissman

(10) Patent No.: US 8,433,315 B2
(45) Date of Patent: *Apr. 30, 2013

(54) WIRED CELLULAR TELEPHONE SYSTEM

(75) Inventor: Haim Weissman, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/114,950

(22) Filed: May 24, 2011

(65) Prior Publication Data

US 2011/0223907 A1    Sep. 15, 2011

Related U.S. Application Data

(63) Continuation of application No. 10/360,860, filed on Feb. 5, 2003, now Pat. No. 7,970,368.

(60) Provisional application No. 60/355,235, filed on Feb. 7, 2002.

(51) Int. Cl.
*H04W 4/00* (2009.01)

(52) U.S. Cl.
USPC ...................................... 455/426.1

(58) Field of Classification Search .......... 455/403, 455/16, 506, 445, 3.06, 561, 67.1, 509, 67.14, 455/426.1; 370/225, 34, 522, 486, 335, 487, 370/490; 725/106; 348/100, 211.1, 211.2, 348/211.3
See application file for complete search history.

(56) References Cited

U.S. PATENT DOCUMENTS

| | | | |
|---|---|---|---|
| 4,704,733 A | 11/1987 | Kawano | |
| 5,281,459 A | 1/1994 | Van Eijck | |
| 5,381,459 A | 1/1995 | Lappington | |
| 5,592,471 A | 1/1997 | Briskman | |
| 5,642,155 A | 6/1997 | Cheng | |

(Continued)

FOREIGN PATENT DOCUMENTS

| | | |
|---|---|---|
| EP | 1168788 A1 | 1/2002 |
| FR | 2693331 A1 | 1/1994 |
| WO | WO9736442 A1 | 10/1997 |
| WO | WO0233855 A1 | 4/2002 |

OTHER PUBLICATIONS

Huan, Nen-Fu et al. "CATV-Based Personal Communications Network: The Architecture and Handoff Schemes" IEICE Transactions on Communications, Tokyo, JP, vol. E82-B, No. 5, May 1999, pp. 740-750.

(Continued)

*Primary Examiner* — Melody Mehrpour
(74) *Attorney, Agent, or Firm* — Stanton Braden

(57) ABSTRACT

Telephone apparatus, including a cable television (CATV) network interface, which is adapted to be connected to a CATV network so as to receive downstream cellular telephone communication signals transmitted at a downstream intermediate frequency (IF) via the CATV network from a base-station transceiver system (BTS) operative in a cellular telephone network. The apparatus includes a telephone interface, which is adapted to connect to a cellular telephone operative in the cellular telephone network via a physical connection.

The apparatus also includes signal conversion circuitry, which is adapted to convert the downstream communication signals received at the downstream IF via the CATV network interface to downstream radio-frequency (RF) cellular telephone signals compatible with the cellular telephone network, and to convey the downstream RF cellular telephone signals to the cellular telephone via the physical connection.

20 Claims, 9 Drawing Sheets

U.S. PATENT DOCUMENTS

| | | | | |
|---|---|---|---|---|
| 5,642,405 A * | 6/1997 | Fischer et al. | | 455/444 |
| 5,666,383 A * | 9/1997 | Huang et al. | | 375/260 |
| 5,680,438 A * | 10/1997 | Beesley | | 455/465 |
| 5,701,579 A * | 12/1997 | Dolan et al. | | 725/106 |
| 5,754,555 A | 5/1998 | Hurme et al. | | |
| 5,802,173 A * | 9/1998 | Hamilton-Piercy et al. | | 379/56.2 |
| 5,822,678 A * | 10/1998 | Evanyk | | 725/106 |
| 5,828,946 A * | 10/1998 | Feisullin et al. | | 725/106 |
| 5,839,052 A | 11/1998 | Dean et al. | | |
| 5,867,763 A | 2/1999 | Dean et al. | | |
| 5,909,471 A | 6/1999 | Yun | | |
| 5,918,154 A | 6/1999 | Beasley | | |
| 5,926,755 A | 7/1999 | Ghisler | | |
| 5,953,670 A * | 9/1999 | Newson | | 455/454 |
| 6,307,851 B1 | 10/2001 | Jung et al. | | |
| 6,334,219 B1 * | 12/2001 | Hill et al. | | 725/106 |
| 6,339,611 B1 | 1/2002 | Antonio et al. | | |
| 6,404,761 B1 | 6/2002 | Snelling et al. | | |
| 6,567,660 B1 | 5/2003 | Wegener | | |
| 6,618,353 B2 | 9/2003 | Merrill et al. | | |
| 6,766,527 B2 | 7/2004 | Tsutsui et al. | | |
| 6,813,619 B2 * | 11/2004 | Devara | | 1/1 |
| 6,865,390 B2 | 3/2005 | Goss et al. | | |
| 6,914,897 B1 | 7/2005 | Schuster et al. | | |
| 6,940,847 B1 | 9/2005 | Glitho et al. | | |
| 7,062,252 B2 | 6/2006 | Weissman | | |
| 7,636,373 B2 | 12/2009 | Binder | | |
| 7,970,368 B2 | 6/2011 | Weissman | | |
| 2001/0005907 A1 | 6/2001 | Pekonen | | |
| 2001/0041548 A1 | 11/2001 | Bult et al. | | |
| 2002/0013852 A1 * | 1/2002 | Janik | | 709/231 |
| 2002/0158689 A1 | 10/2002 | Harris et al. | | |
| 2002/0191565 A1 | 12/2002 | Mani et al. | | |
| 2003/0004756 A1 | 1/2003 | Okamoto et al. | | |
| 2003/0064681 A1 | 4/2003 | Uedo | | |
| 2004/0166833 A1 | 8/2004 | Shklarsky et al. | | |
| 2004/0203468 A1 | 10/2004 | Dent et al. | | |
| 2005/0026561 A1 | 2/2005 | Shklarsky et al. | | |
| 2005/0090246 A1 | 4/2005 | Leermakers | | |
| 2006/0085534 A1 | 4/2006 | Ralston et al. | | |
| 2006/0159116 A1 | 7/2006 | Gerszberg et al. | | |
| 2006/0187900 A1 | 8/2006 | Akbar | | |
| 2007/0120968 A1 | 5/2007 | Krisbergh et al. | | |
| 2008/0263609 A1 * | 10/2008 | Shklarsky et al. | | 725/106 |
| 2010/0135191 A1 | 6/2010 | Binder | | |

OTHER PUBLICATIONS

International Search Report PCT/US03/03815, International Search Authority EPO, Jun. 26, 2003.

* cited by examiner

WIRED CELLULAR TELEPHONE SYSTEM

CROSS REFERENCE TO RELATED APPLICATION

This application is a continuation of patent application Ser. No. 10/360,861, filed Feb. 5, 2003, which claims the benefit of U.S. provisional patent application 60/355,235, filed Feb. 7, 2002, which is incorporated herein by reference.

FIELD OF THE INVENTION

The present invention relates generally to communication systems, and specifically to wired and cellular telephone systems.

BACKGROUND OF THE INVENTION

There are a number of telephone systems that are very well known in the art. The oldest system, and probably still the most widely used, is a public switched telephone network (PSTN) where a simple telephone is physically coupled to a telephone network via conducting wires. An extension to the PSTN comprises a cordless telephone system, typically used in a home or an office, where a portable telephone communicates in an unwired manner with a console in the home. The console is wired to the PSTN in place of the simple telephone, and the communication between the console and the portable phone is generally via a radio-frequency (RF) carrier, although other methods such as using an infra-red carrier are also known in the art.

A cable television (CATV) system may also be used as another wired system for transferring PSTN telephone signals. The CATV system is coupled at its uplink side to the PSTN. At the downlink side, e.g., in a home or office environment, a landline telephone may be coupled to the CATV system via a modem. The CATV system conveys the PSTN telephone signals via the CATV cables, using a carrier that is not used for transmitting television signals in the CATV system.

Cellular telephone systems use non-wired mobile cellular telephones that communicate with a central base-station. Communication between the mobile telephones and the base-station is via a cellular RF carrier, the cellular RF carrier being at a different frequency, and having substantially greater power, than the RF carrier of the cordless telephone system. Furthermore, cellular telephones can only connect via a wireless connection and are unable to physically connect to their cellular network. Accordingly, it would be advantageous for there to be a method and apparatus that would allow a cellular telephone to communicate with the associated cellular network over a cable television network.

SUMMARY OF THE INVENTION

A method and apparatus is disclosed that enables a cellular telephone to communicate with its cellular network via a cable television network. The disclosed method and apparatus integrates operations of a public switched telephone network (PSTN) telephone and a cellular telephone.

In one embodiment of the disclosed method and apparatus, a console acts as a "docking" station for a cellular mobile telephone. The console is connected via a wired network, such as a cable television network, to a base station of a cellular network within which the mobile telephone operates or is capable of operating. The console and the base station communicate via an intermediate frequency (IF) carrier compatible with the cable network. In a first operational mode, the telephone is "docked" in the console and is electrically and physically connected by a docking receptacle, which acts as a telephone interface, to the console. In one embodiment, the telephone and the base station communicate via the cable network, and there is virtually no radio-frequency (RF) radiation from the mobile telephone. The conversion between the IF and RF is made by signal conversion circuitry in the console.

In another embodiment, when the telephone is undocked from, and is relatively close to the console, the telephone and the base-station communicate via the console, so that the telephone only uses very low levels of RF power.

In yet another embodiment, the telephone may be capable of connecting to the console in either of the ways described above. In addition, the telephone has a mode that corresponds to a "standard" operating mode of a telephone within a cellular network. The standard mode is active when the cellular telephone is out of the console's range. In the standard mode, the telephone may communicate with the base station "over the air," or may communicate with another base station of the cellular network.

By providing a console that can accept the cellular telephoned communicate with a base station via a cable network, the telephone is able to act as both a cordless telephone and as a mobile telephone. Furthermore, when acting as a cordless telephone, RF radiation from the telephone is virtually non-existent or is substantially reduced compared to RF power levels when the telephone operates in its standard mode.

In one embodiment of the disclosed method and apparatus, the console is adapted to accept more than one mobile telephone, the one or more extra telephones acting as a vehicle enabling voice and/or communications other than voice, such as data. Alternatively or additionally, the console is able to act as a local communication center capable of being coupled to other communication devices such as a computer or one or more landline telephones. In some embodiments of the disclosed method and apparatus, the console, together with its one or more mobile telephones, acts as a video phone. In such cases, the console incorporates a video camera, or is adapted to receive camera signals, for transmitting images. Received video images are projected onto a television coupled to the cable network.

In one embodiment of the disclosed method and apparatus, the console comprises a mobile site modem (MSM) which enables the console alone to function as a telephone within the cellular network. In these embodiments, the console may act as one cellular telephone, operating in a wired or a cordless mode, and optionally comprising a speaker. The mobile telephone which is docked in the console may act as a separate, second cellular telephone, the two telephones having different numbers and preferably communicating by different IF carriers, and/or channels and/or time slots, with the base station. Optionally, a user may assign a priority to the numbers, and/or implement automatic transfer between the numbers.

In one embodiment of the disclosed method and apparatus, the console is connected to a PSTN. The console is able to receive and make both PSTN calls and cellular calls. Similarly, telephones connected to the console, either cellular telephones physically coupled to the console or wirelessly coupled to the console, or PSTN telephones, can make or receive either cellular or PSTN calls. Most preferably, the console is also configured to operate as a session initiation protocol (SIP) gateway, so that SIP calls may be made and received at the console, and by telephones, including SIP telephones, that may be coupled to the console.

The disclosed method and apparatus will be more fully understood from the following detailed description, taken together with the drawings.

DETAILED DESCRIPTION OF PREFERRED EMBODIMENTS

Figure 1:
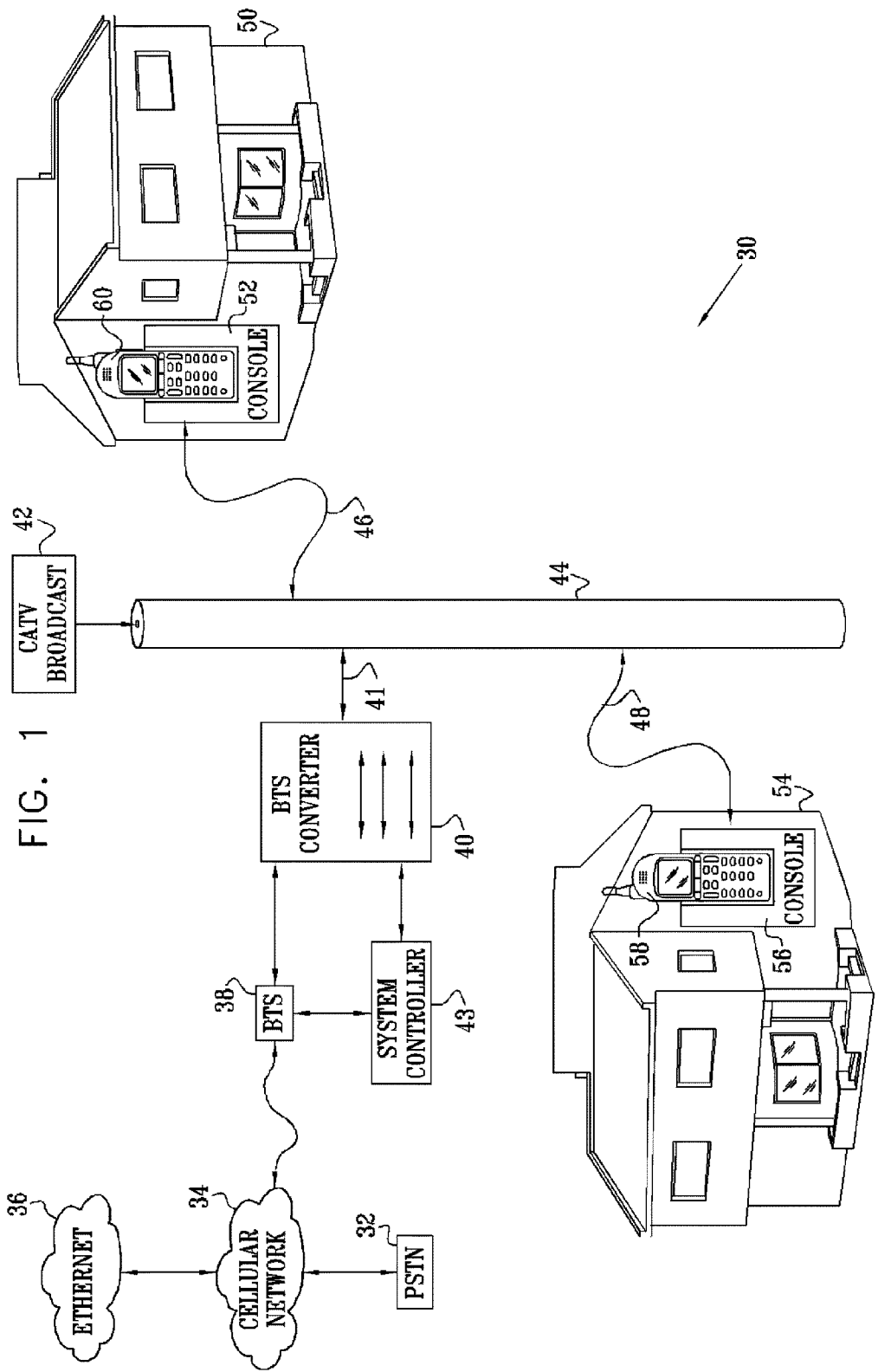
FIG. 1 is a schematic diagram illustrating a wired cellular system, according to a preferred embodiment of the present invention.

Reference is now made to FIG. 1, which is a schematic diagram illustrating a wired cellular system 30 according to an embodiment of the disclosed method and apparatus. At an upstream side of system 30, a cellular network base-station transceiver system (BTS) 38, also referred to as a cable-coupled BTS, is coupled via a BTS frequency converter 40 to a cabling system 44 of a cable television (CATV) broadcast network 42. Cabling system 44 comprises any cabling method known in the art, such as coaxial cable and/or fiber optic cable, or a combination of such methods. The BTS 38 communicates with the cabling system 44 directly by intermediate frequency (IF) signals, i.e., the BTS transmits IF cellular downstream signals, and receives IF cellular upstream signals. Preferably, the upstream and downstream IF signals are converted to and from radio-frequency (RF) cellular signals by converter 40. The intermediate frequencies are chosen so that they do not interfere with other services provided by the CATV network. It should be noted that even though it is common for RF signals to be of a higher frequency than IF signals, the IF signals selected for use over the cable network may be either higher or lower than the radio-frequencies of the cellular signals. Upstream of the BTS, the BTS communicates with its cellular network 34 and other upstream elements coupled to the cellular network, such as an Ethernet network 36 and a public switched telephone network (PSTN) 32, by any means known in the art. Operations of BTS 38 and converter 40 are under the overall control of a system controller 43, which is able, inter alia, to select IF frequencies to be used, as is described in more detail below.

It will be appreciated that embodiments of the disclosed method and apparatus may be implemented for any cellular communication system, including a Code Division Multiple Access (CDMA) system, a Time Division Multiple Access (TDMA) system, a Frequency Division Multiple Access (FDMA), and/or combinations of these and other communication systems known in the art.

It will also be appreciated that since BTS 38 communicates on its downstream side via a cable 41 using IF, the BTS and BTS converter 40 may be implemented as a "stripped-down" version of a standard BTS. Most preferably, the stripped-down BTS comprises a cell site modem (CSM) which communicates with CATV cabling system 44 using IF signals. Optionally, more than one CSM may be used, preferably mounted on one board, if more than one IF carrier is used. Situations when more than one IF carrier may be used are described below.

CATV cabling system 44 is coupled at its downstream side to individual cable TV receivers, which are typically dwelling units, although any other entity to which system 44 is coupled, such as an office, may act as a cable TV receiver. Each cable TV receiver is coupled to CATV cabling system 44 by a cable. Herein, by way of example, two generally similar homes 50 and 54 operate as cable TV receivers, being respectively coupled to system 44 by cables 46 and 48.

Terminating each cable from system 44 at the system's downstream side is a console, so that home 50 has a console 52 coupled to cable 46, and home 54 has a generally similar console 56 coupled to cable 48. As is described in more detail below, each console acts as cellular signal converter, so that downstream IF cellular signals received from system 44 are converted to downstream RF cellular signals, and so that upstream RF cellular signals are converted to upstream IF cellular signals. Each console 52 and 56 is adapted to transfer signals between the console and respective cellular telephones 60 and 58.

Figure 2:
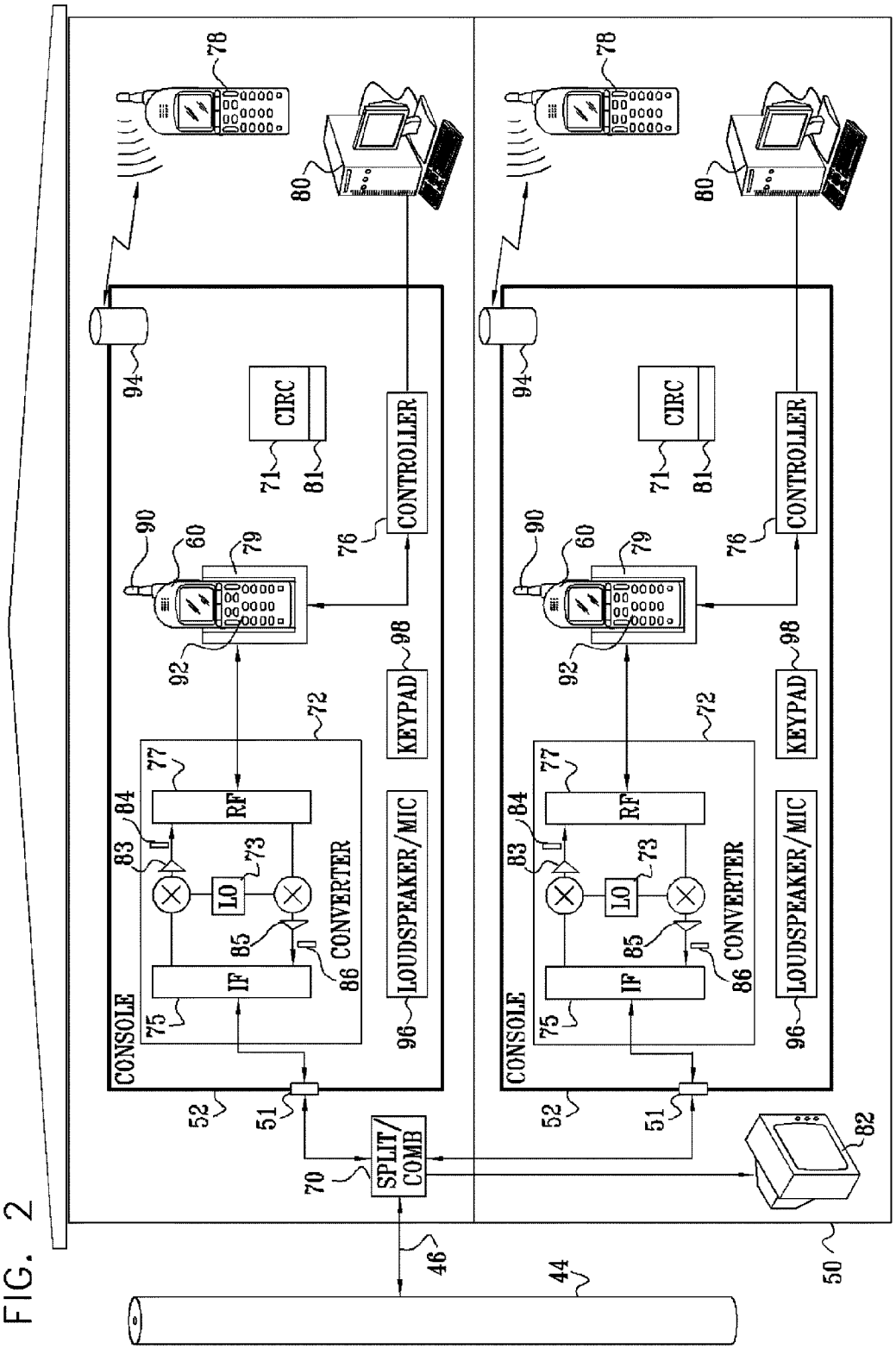
FIG. 2 is a schematic diagram illustrating elements of the system of FIG. 1 in a home, according to a preferred embodiment of the present invention.

FIG. 2 is a schematic diagram illustrating elements of system 30 at home 50, and connections between the elements, according to one embodiment of the disclosed method and apparatus. A splitter/combiner 70 coupled to cable 46 separates CATV signals from system 44, and conveys the signals to a television 82. Splitter/combiner 70 also conveys IF cellular signals to and from console 52 in home 50 via a CATV network interface 51. As is shown in FIG. 2, more than one generally similar console 52, and elements coupled to the downstream side of the consoles, may be coupled to splitter/combiner 70. By way of example, two such consoles 52 are shown in FIG. 2.

Console 52 comprises signal conversion circuitry 72, which in turn comprises an IF diplexer 75, one or more local oscillators 73, and an RF diplexer 77. Circuitry 72 converts IF downstream cellular signals to RF downstream cellular signals, and RF upstream cellular signals to IF upstream cellular signals. A downstream RF amplifier 83, having an adjustable amplification, amplifies the RF downstream cellular signals. A downstream RF signal detector 84 measures a level of the RF downstream cellular signals generated by circuitry 72. Also, an upstream amplifier 85, having an adjustable amplification, amplifies the IF upstream cellular signals, and an upstream signal detector 85 measures a level of the IF upstream cellular signals. Most preferably, the one or more local oscillators 73 comprise two oscillators whose frequencies are controlled by controller 76, or by another controller (as exemplified below with reference to FIG. 6) in the console, so that the upstream IF and downstream IF frequencies may be set independently. Console 52 comprises a docking receptacle 79 which is coupled to RF diplexer 77 and which transmits the RF upstream cellular signals to the diplexer, and receives the RF downstream signals from the diplexer.

Docking receptacle 79 is configured to accept cellular telephone 60 and acts as a telephone interface, as described below. When telephone 60 is docked in receptacle 79, corresponding to a first mode of operation of console 52, console 52 diverts the RF upstream and downstream signals from an antenna 90 of telephone 60 directly to and from internal circuitry 92 of the telephone. Console 52 also comprises a loudspeaker/microphone 96 and, preferably, a keypad 98. Thus, in its docked state, telephone 60 is able to communicate with BTS 38 via console 52 without radiating RF cellular signal radiation into home 50. In the docked state, console 52 most preferably maintains downstream RF cellular signals at a pre-set first mode low RF power level, using amplifier 83 and detector 84. Similarly, upstream IF cellular signals are most preferably adjusted, using amplifier 85 and detector 86, to avoid crossing an upstream threshold limit.

Most preferably, in its docked state, baseband signals that would be generated at telephone 60 are diverted to loudspeaker/microphone 96, so that the telephone effectively operates as a "loudspeaker" phone, from which, if keypad 98 is implemented, calls may be made from the keypad. Alternatively, if keypad 98 is not implemented, calls may be made from the keypad of telephone 60. Thus, in the first mode of operation of console 52, the console-telephone combination operates substantially as part of a wired cellular telephone system.

Console 52 also comprises an antenna 94. In the first mode of operation of console 52, when telephone 60 is docked in receptacle 79, antenna 94 may be implemented to couple console 52 to an extension telephone 78 which acts as a cordless phone communicating with the console. Most preferably, communications between antenna 94 and extension telephone 78 are by a protocol known in the art, such as a cordless telephone protocol, a Bluetooth protocol, or an IEEE 802.11 protocol.

Console 52 is also implemented to operate in a second operating mode, effective when telephone 60 is "un-docked" from receptacle 79. In the second mode of operation, communications between telephone 60 and console 52 are effected by RF cellular signals between antenna 90 and antenna 94. The RF cellular signals are preferably set at a low power level, consistent with antennas 90 and 94 being close to each other, and are most preferably near-field RF cellular radiation signals. Alternatively, the signals comprise far-field RF cellular radiation signals, or a combination of near- and far-field signals. As for the docked state described above, in the second un-docked mode console 52 most preferably maintains downstream RF cellular signals at a pre-set second mode low RF power level, using amplifier 83 and detector 84, and upstream IF cellular signals at a level that avoids crossing the upstream threshold limit, using amplifier 85 and detector 86. Preferably, the levels are substantially fixed at installation of system 30 and/or of console 52. Optionally, the levels may be altered by controller 76, and/or by communication from BTS 38, or by any other means known in the art.

Preferably, a gain of amplifier 83 is set so that the pre-set second mode low RF power level radiated from console 52, and consequently the upstream RF power level radiated from mobile telephone 60, are both low and approximately equal. Alternatively, the gain of amplifier 83 is set so that mobile telephone 60 transmits an upstream RF signal level that requires low gain in amplifier 85, so as to minimize noise radiated into CATV system 44.

Most preferably, the pre-set levels and the amplification gains provided by amplifiers 83 and 85 are set in conjunction with a method of signal transmission used between BTS 38 and console 52, as described in more detail below with reference to FIG. 4.

It will be understood that if antenna 94 has been implemented to communicate with extension telephone 78, the antenna is implemented to radiate and receive both RF cellular signals and RF signals compatible with communicating with the extension telephone.

Most preferably, when console 52 operates in its second operating mode, RF radiation levels for antennas 90 and 94 are set to be equal to or less than RF levels of cordless telephone protocols.

The second operating mode corresponds to telephone 60 and console 52 being used in a cordless cellular phone arrangement, and it will be appreciated that the RF power levels used by the telephone and the console, including the pre-set levels described above, in embodiments of the disclosed method and apparatus are of the same order as, or lower than, power levels transmitted by cordless telephone systems. The second mode is operative while telephone 60 and console 52 are within range of each other, the range depending on the RF power levels which the console and the telephone use. Most preferably, the RF power levels of both telephone 60 and console 52 are pre-set to enable the telephone to operate within a home or at another location wherein the console is positioned, such as by setting levels of the RF power to be receivable when the telephone and the console are at a pre-set distance from each other.

It will be appreciated that in both the first and the second mode of operation of console 52, there is very little loss of signal power between the communicating telephone and BTS 38. Also, problems such as multiple Rayleigh reflections that are associated with typical cellular communications are absent. Thus, in both modes of operation of console 52 the RF power amplification requirement is relatively small.

Optionally, console 52 comprises a controller 76 which enables a computer 80 to be coupled to the console. If controller 76 is implemented, it most preferably enables computer 80 to receive and transmit compatible cellular signals, such as cellular video transmissions, as are known in the art.

In a third operating mode, telephone 60 operates as a standard cellular telephone. The third mode becomes operative when telephone 60 is out of a range between the telephone and the console implemented for the second mode, typically when a user of the phone takes the phone from the home or office where the console is situated. When the third mode is operative, transmission from console 52 is substantially shut off. Thus, the telephone may communicate with BTS 38, or another BTS operative in cellular network 34, over-the-air (OTA).

In some embodiments of the disclosed method and apparatus, console 52 itself operates as a "stand-alone" cellular telephone. In this case, console 52 comprises circuitry 71 that is substantially similar to that of telephone 60 and/or that may include a mobile site modem (MSM) 81, circuitry 71 being implemented in place of docking receptacle 79, using RF circuitry. Preferably, keypad 98 and loudspeaker/microphone 96 are implemented so that console 52 may communicate with BTS 38 via cable 46. Alternatively or additionally, a wired or a cordless handset may be coupled to console 52. It will be understood that, depending on how circuitry 71 is implemented, communications between the console and BTS 38 may be directly via IF cellular signals, or via RF and IF cellular signals.

In another embodiment of the disclosed method and apparatus, console 52 may be implemented to operate as a combined stand-alone and docking receptacle for telephone 60. In this case console 52 is implemented to support two separate telephone systems, one for the console itself, and a second for telephone 60. The two systems most preferably have different numbers, and the numbers may be prioritized by a user of the console, so that, for example, if a caller is unable to contact the user on one number the console automatically switches to the other number.

Figure 3:
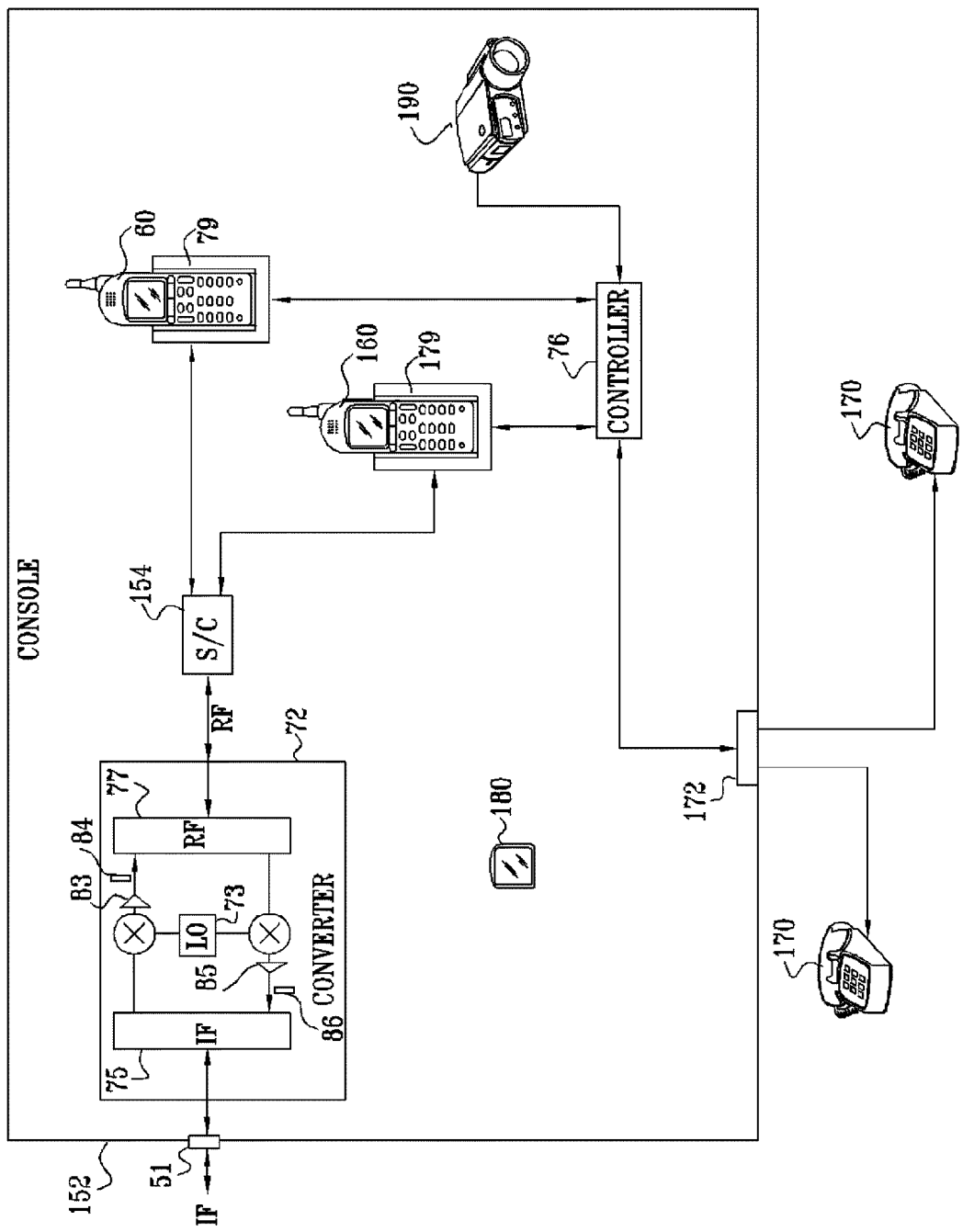
FIG. 3 is a schematic diagram illustrating a console operative in the system of FIG. 1, according to an alternative preferred embodiment of the present invention.

FIG. 3 is a schematic diagram illustrating a console 152, according to an alternative embodiment of the method and apparatus. Apart from the differences described below, the operation and implementation of console 152 is generally similar to that of console 52 (FIGS. 1 and 2), such that elements indicated by the same reference numerals in both consoles 52 and 152 are generally identical in construction and in operation. Console 152 includes a high data rate docking receptacle 179, generally similar to docking receptacle 79, which acts as a receptacle and as a high data rate telephone interface for a high data rate cellular telephone 160. A splitter/combiner 154 is implemented in console 152 to separate high data rate cellular signals suitable for telephone 160 and cellular signals suitable for telephone 60.

Optionally, console 152 comprises a connection 172 which enables the console to act as a local telephone exchange (PBX) between telephones 60 and 160 and one or more PSTN telephones 170 coupled to the console by wires. Further optionally, console 152 comprises a video camera 190 and/or is adapted to receive video signals from an external video camera, which enables the console to be used as a cellular video phone. Console 152 is implemented to transfer video images from the video camera on the IF cellular upstream signals. Television 82 (FIG. 2), or another television such as a television screen 180 incorporated into the console, is adapted receive video signals from the IF cellular downstream signals, so that the combination of the television and console 152 may be used as a video telephone link. Preferably, video camera 190 and connection 172 are coupled to receptacles 79 and 179 via controller 76. Alternatively, the camera and the connection are coupled directly, with controller 76 acting to control communications between the connection, the video camera, and receptacles 79 and 179. Further alternatively, connection 172 is configured to support one or more signal transmission protocols known in the art, such as a firewire protocol.

It will be understood that consoles 52 or 152 may each be implemented to transfer IF cellular signals between the console and BTS 38 on more than one IF carrier, depending, inter alia, on the bandwidth requirements of the particular console. It will also be understood that different consoles, such as console 52 and console 56 (FIG. 1), may use different IF carriers. Typically, as illustrated in FIG. 1 by the multiple IF lines within converter 40, BTS converter 40 and/or BTS 38 are implemented to operate with a multiplicity of different IF carriers. It will be appreciated that operation of system 30 using a multiplicity of IF carriers is advantageous, enabling signals between different regions/consoles of system 30 to be more easily controlled by a controller operating BTS 38.

System 30 typically operates by overall IF bandwidths being allocated for cellular network 34 use by cabling system 44, the allocated bandwidths being selected so as not to interfere with frequencies of CATV signals used by system 44. Within the overall IF bandwidth available for cellular use, each console operative within system 30 requires a relatively narrow IF carrier for its specific operations. Thus, operating system 30 with a multiplicity of IF carriers also enables bandwidth to be more efficiently allocated. Preferably, consoles operative within system 30 have selectable IF carriers, a particular IF carrier being selected by altering the frequency of LO 73 (FIG. 2). Most preferably, the selection of the IF carrier of a particular console is controlled by commands issued from system controller 43 (FIG. 1), using any system known in the art, such as a short messaging system (SMS) protocol. Additionally or alternatively, selection of the IF carrier may be performed substantially independently by the particular console.

Figure 4:
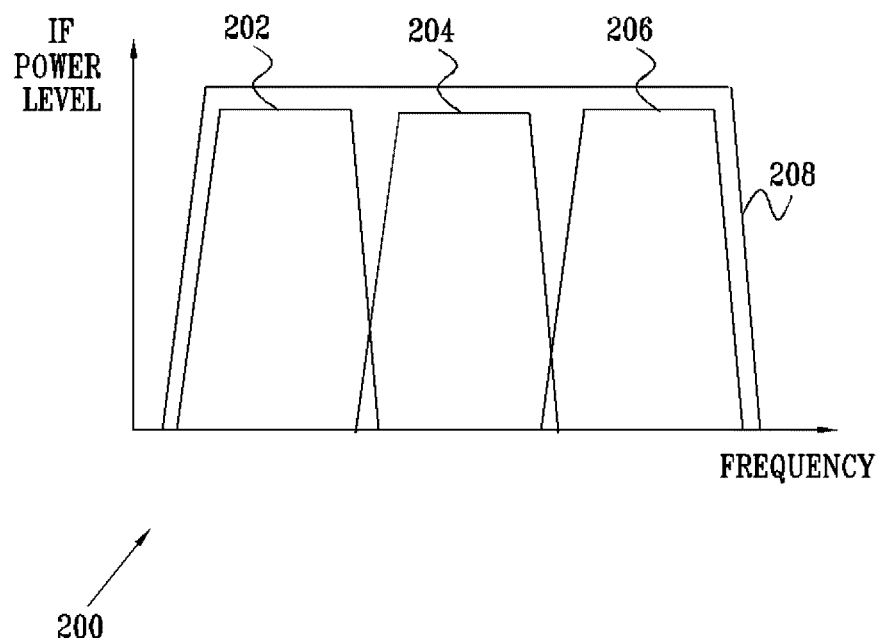
FIG. 4 is a schematic graph illustrating intermediate frequency carriers that may be used in the system of FIG. 1, according to a preferred embodiment of the present invention.

FIG. 4 is a schematic graph 200 illustrating IF carriers that may be used in system 30, according to a embodiment of the method and apparatus. Graph 200 shows a wide IF carrier 208, and a plurality of narrow IF carriers; by way of example three narrow IF carriers 202, 204, and 206, are illustrated, although it will be understood that the number of narrow IF carriers may be another whole number greater than one.

In a first method of communication, BTS 38 and console 52 use wide IF carrier 200 for both downstream and upstream signals. In a second method wide IF carrier 200 is used for downstream transmission, and one of the narrow IF carriers 202, 204, or 206 is used for upstream transmission. In the second method, console 52 is most preferably configured to select one of the narrow IF carriers on a random basis. In a third method, the console selects one of the narrow IF carriers on a random basis for upstream and downstream transmission.

The method used for transmission between BTS 38 and console 58 is preferably chosen to maximize capacity of system 30. Most preferably, the method is also chosen in conjunction with considerations of power levels transmitted and amplification needed, as described above with reference to FIG. 2, so as to optimize performance of system 30 and to minimize noise radiated into CATV system 44.

Figure 5:
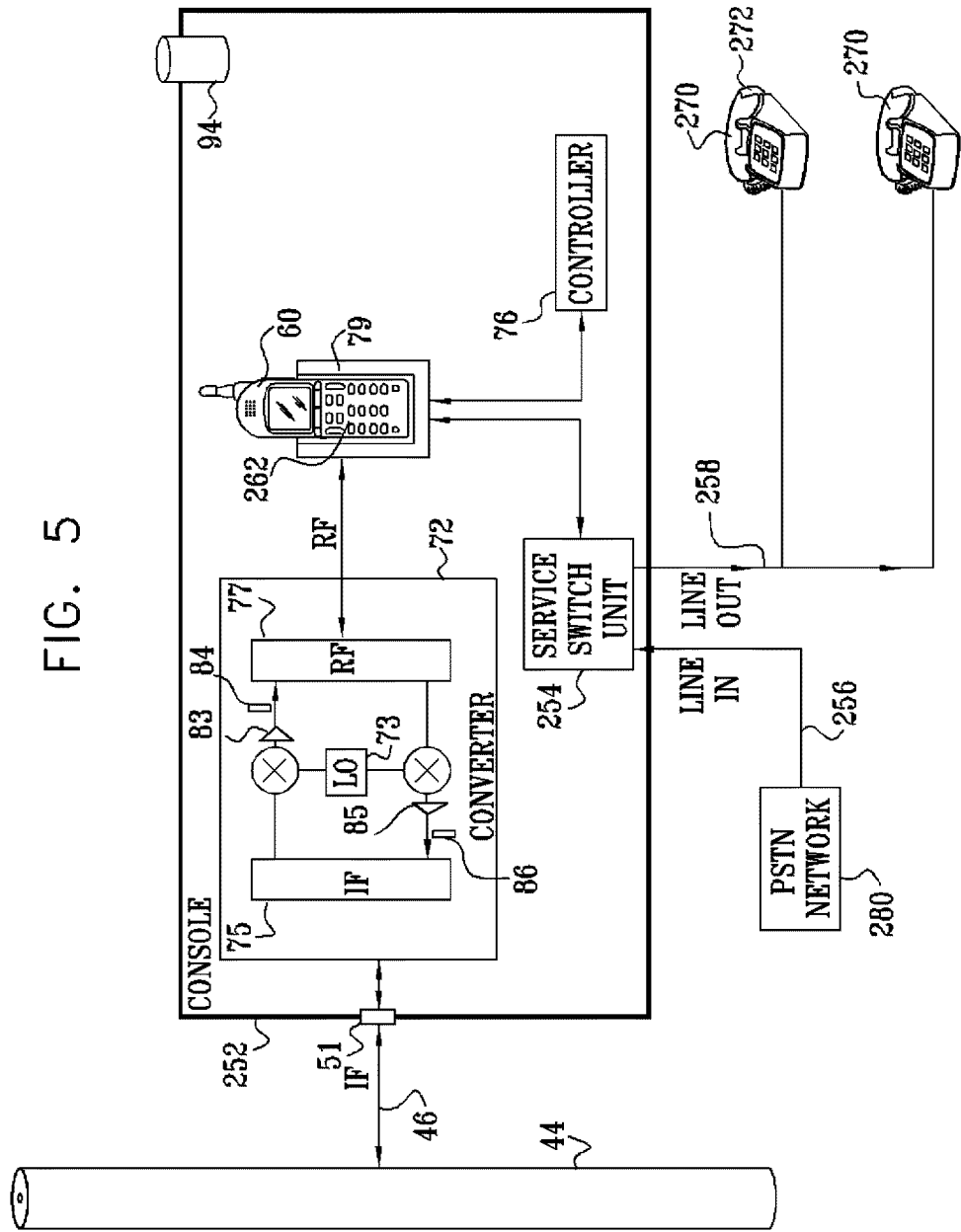
FIG. 5 is a schematic diagram illustrating an alternative console, according to a preferred embodiment of the present invention.

FIG. 5 is a schematic diagram illustrating a console 252, according to another embodiment of the disclosed method and apparatus. Apart from the differences described below, the operation of console 252 is generally similar to that of console 52 (FIGS. 1 and 2), such that elements indicated by the same reference numerals in both consoles 52 and 252 are generally identical in construction and in operation. In addition to being coupled to BTS 38 by cable 46 and cabling system 44, console 252 is coupled to a PSTN network 280 via a PSTN line in 256 and a PSTN line out 258, the latter being in turn connected to one or more PSTN phones 270. Console 252 comprises a service switch unit 254, which connects lines 256 and 258 to cellular telephone 60 and docking receptacle 79, which switches between the cellular and PSTN services available to console 252, and which acts as a PSTN interface.

Service switch unit 254 enables console 252 to receive incoming, and make outgoing, cellular and PSTN calls. Unit 254 is described in more detail below with reference to FIG. 6. When console 252 is in an idle state, i.e., when the console is not receiving an incoming call, making an outgoing call, or does not have an open call, unit 254 preferably routes an incoming PSTN call (received via line 256) to one or more of PSTN telephones 270. Alternatively or additionally, console 252 is implemented so that telephone 60 receives the incoming PSTN call. Similarly, when console 252 is in an idle state and an incoming cellular call is received via cable 46, the call is also preferably routed to one or more of PSTN telephones 270. Alternatively or additionally, as for the incoming PSTN call, the incoming cellular call is routed to telephone 60. It will be understood that console 252 may be in an idle state when telephone 60 is docked in receptacle 79 or when the telephone is undocked from the receptacle. Depending on which type of call is received, console 252 informs cellular network 34 or PSTN network that the call—cellular or PSTN—is being answered and that the respective service is in use, while allowing access to the service that is not being used.

Most preferably, console 252 generates a distinctive visual and/or audible signal representative of the incoming call, such as a ring tone that enables a user hearing the ring to distinguish the incoming call as a cellular call or as a PSTN call.

When console 252 is in an idle state, unit 254 most preferably routes calls made from one of telephones 270, initiated by a user setting the telephone to be off-hook, to line out 258. Alternatively, a user wishing to make a cellular call from telephone 270, via console 252 that is initially in an idle state, may inform the console of such a need by dialing a predetermined code, such as , from telephone 270. If console 252 comprises more than one cellular line, such as described above with reference to console 152, then the predetermined code may be of a form that identifies the particular line chosen, such as 1 or **2.

If an incoming cellular call is received while one of telephones 270 is off-hook on a PSTN call, console 252 generates an indication of receipt of the incoming call, the indication preferably being a "flash" tone to the off-hook telephone 270, although any other audible and/or visual indication may be used. Similarly if an incoming PSTN call is received while one of telephones 270 has an open cellular call, a flash tone is also generated.

Most preferably, console 252 integrates services known in the art that are provided by both PSTN telephone 270 and cellular telephone 60. For example, console 252 is able to scan a memory 262 in telephone 60, and provide data from the memory to telephone 270, most preferably by commands issued from telephone 270 to the console. The commands may be by keystrokes from telephone 270. The data stored in memory 262 preferably comprises information such as a stored telephone directory. Most preferably, telephone 270 comprises a graphic interface 272 enabling it to display results of the commands. Services that may be integrated comprise, but are not limited to, call waiting, speed dial, voice commands, caller identification, and small messaging system (SMS) messages.

It will be understood that the disclosed method and apparatus may include a console having combinations of features from more than one of the consoles 52, 152, and 252. Such a combination includes, but is not limited to, a combined console having multiple cellular phones and/or a video camera, such as are described with reference to console 152, the combined console also having PSTN and cellular calling capability, as are described with reference to console 252. Other combinations will be apparent to those skilled in the art. All of the combinations are understood to be within the scope of the disclosed method and apparatus.

Figure 6:
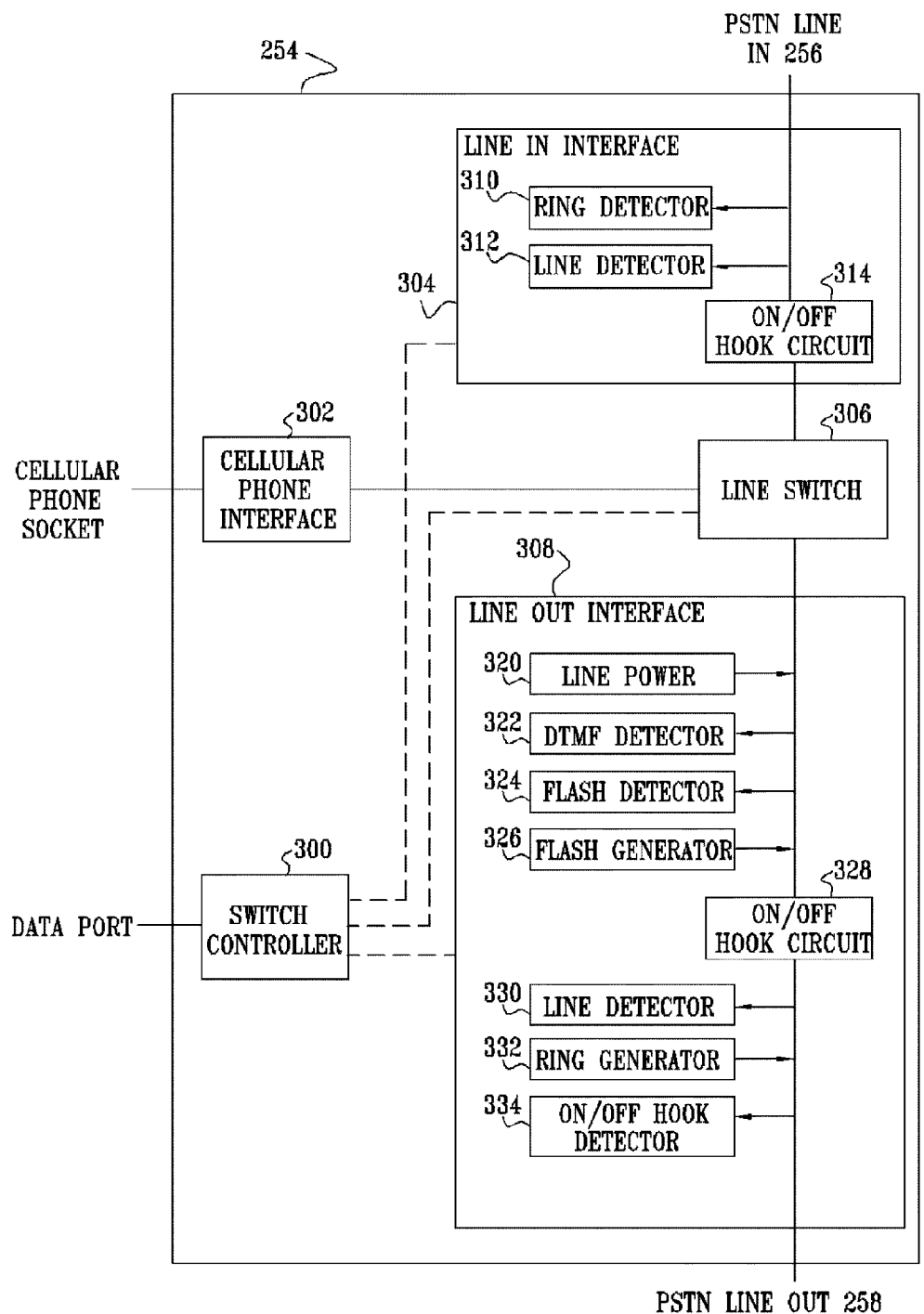
FIG. 6 is a schematic block diagram of a service switch unit, according to a preferred embodiment of the present invention.

FIG. 6 is a schematic block diagram of service switch unit 254, according to an embodiment of the disclosed method and apparatus. A line in interface 304 comprises a line detector 310 that detects the presence of PSTN line in 256, and signals on the line. The interface also includes a ring detector 310 that senses incoming PSTN calls when console 252, or a telephone coupled to the console, is engaged in an open cellular call. Interface 304 also comprises an on/off hook circuit 314 that goes to an off-hook state when a cellular call is made by console 252.

A line out interface 308 comprises substantially all components for line out 258 to operate as part of PSTN network 280. Interface 308 comprises a power supply 320 that powers telephones 270 coupled to line 258, a dual tone multi frequency (DTMF) detector that detects and translates DTMF tones received from the telephones, a flash detector 324 that detects a flash tone received from the telephones, and a flash generator that generates a flash tone for the telephones. Interface 308 comprises an on/off circuit 328 which switches between an on-hook and an off-hook state according to an operative state of telephones 270. Interface 308 also comprises a line detector 330 that detects the presence of PSTN line out 258, and signals on the line, a ring generator 332, and an on/off hook detector 334 that detects the state of telephones 270.

A cellular phone interface 302 provides coupling between docking receptacle 79, converting between signals on lines 256 and 258 and signals which are compatible with telephone 60. It will be understood that at least part of interface 302 may be incorporated in receptacle 79. A line switch 306 performs switching between interfaces 304, 302, and 308, under the control of a switch controller 300. Controller 300 acts as an overall controller of switch 254, receiving signals from, and generating signals for, the interfaces. At least some of the functions of controller 300 and controller 76 may be transferred between the controllers; for example, controller 300 may be implemented to at least partly control IF frequencies used by circuitry 72, and/or an RF power level generated by the circuitry.

Figure 7:
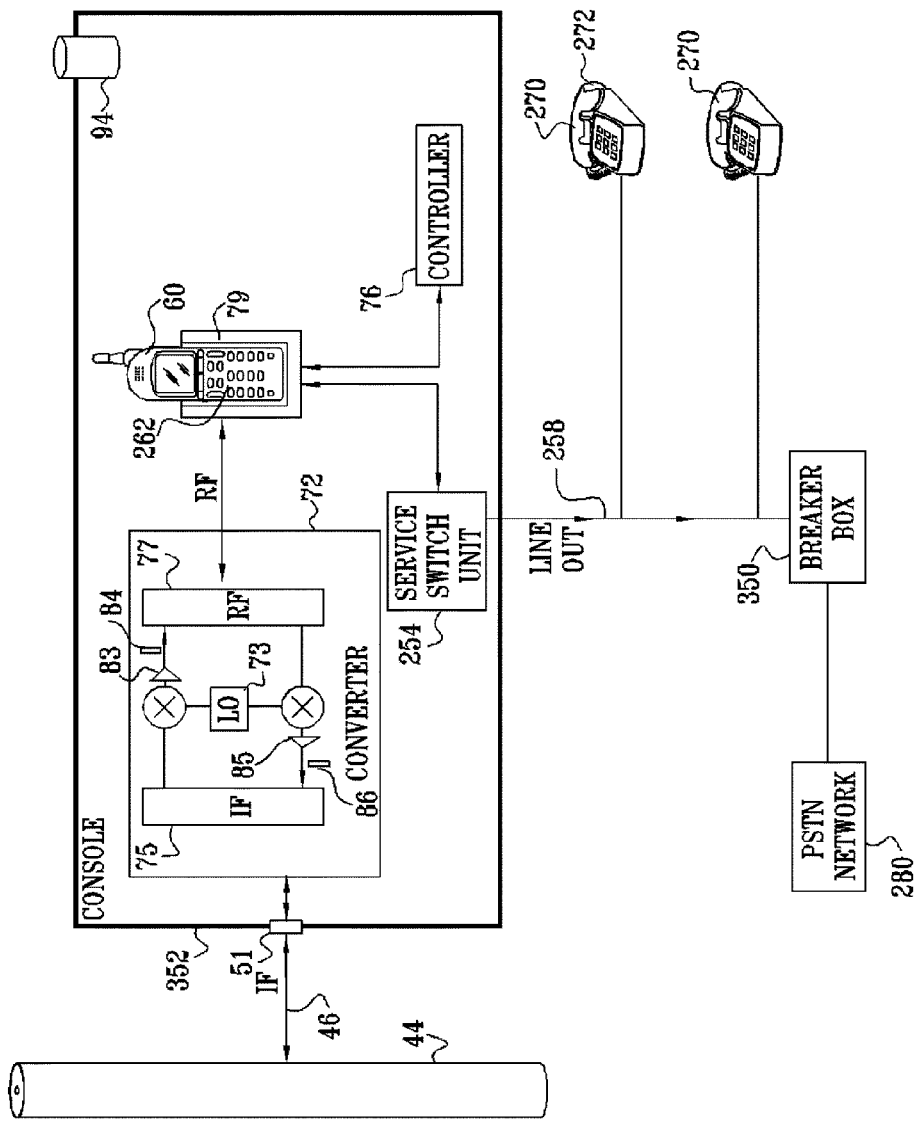
FIG. 7 is a schematic diagram illustrating a further alternative console, according to a preferred embodiment of the present invention.

FIG. 7 is a schematic diagram illustrating a console 352, according to an embodiment of the disclosed method and apparatus. Apart from the differences described below, the operation of console 352 is generally similar to that of console 252 (FIG. 5), such that elements indicated by the same reference numerals in both consoles 352 and 252 are generally identical in construction and in operation. Rather than all the switching on PSTN line 258 being performed by service switch unit 254, a breaker box 350 houses line in interface 304 of the unit and performs substantially all the functions of the interface, disconnecting the PSTN line when telephones 270 are making a cellular call. Breaker box 350 is installed between telephones 270 and PSTN network 280, and is implemented to detect signals such as predetermined ** tones and ring tones from PSTN network 280, and is also implemented to generate flash tones to telephones 270. Using breaker box 350 allows a user to install console 352 at any position on line out 258, separately from the breaker box.

Figure 8:
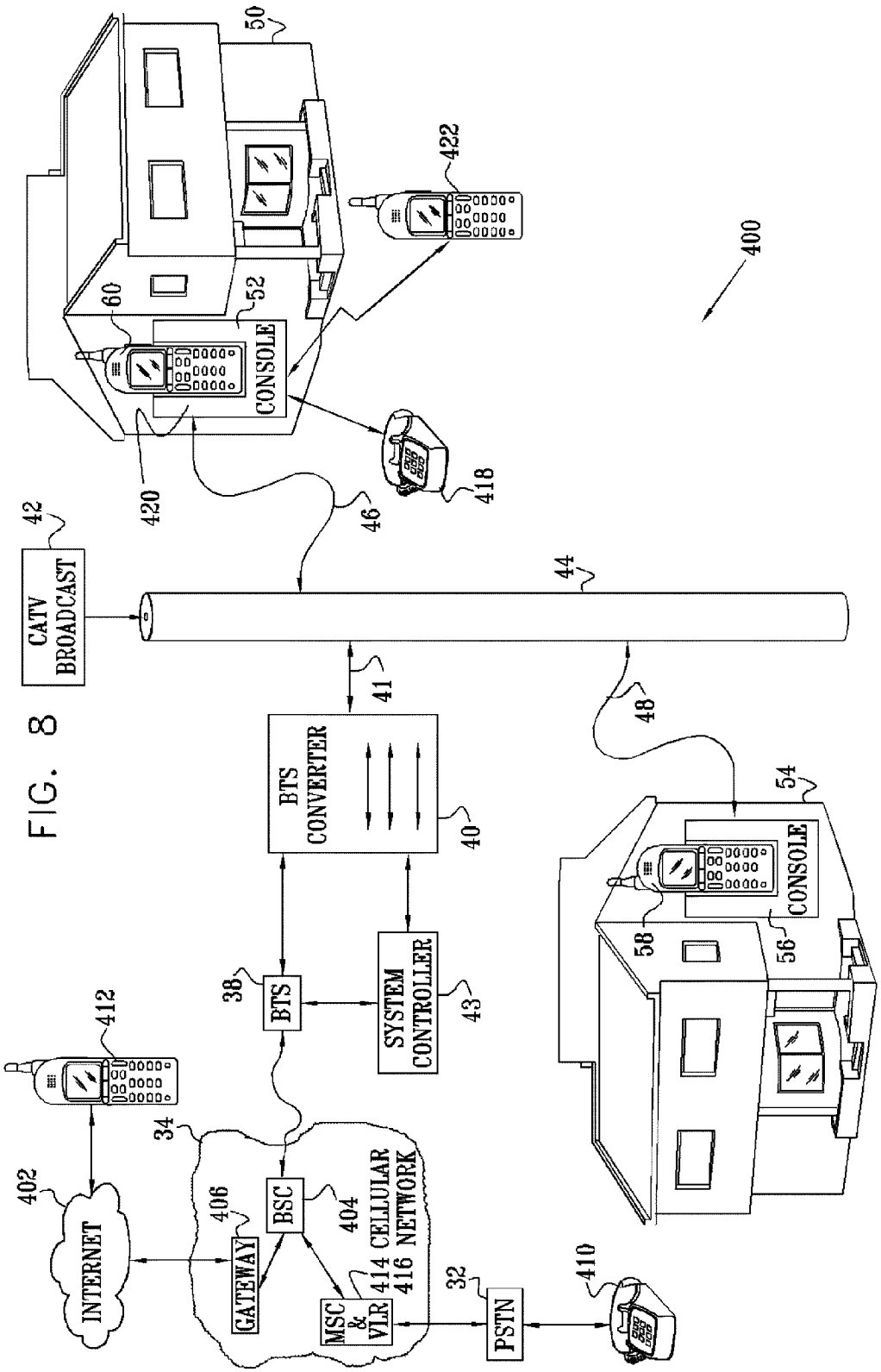
FIG. 8 is a schematic diagram illustrating an alternative wired cellular system, according to a preferred embodiment of the present invention.

FIG. 8 is a schematic diagram illustrating an alternative wired cellular system 400, according to an embodiment of the disclosed method and apparatus. Apart from the differences described below, the operation of system 400 is generally similar to that of system 30 (FIGS. 1-7), such that elements indicated by the same reference numerals in both systems 30 and 400 are generally identical in construction and in operation. In system 400 a base-station controller (BSC) 404 controls and communicates with BTS 38 within cellular network 34. BSC also communicates with PSTN 32 via a mobile switching center (MSC) 414 and a visitor location register (VLR), and PSTN 32 is connected to a PSTN telephone 410. Communication between PSTN 32 and telephone 410 may be via an Integrated Services Digital Network (ISDN) connection.

BSC 404 is coupled to a packet switching network 402, such as the Internet, via a gateway 406. Gateway 406 comprises a packet data serving node (PDSN), a gateway general-packet-radio-service (GPRS) support node (GGSN), and/or a serving GPRS support node (SSGN), or any combination of these or any other nodes that enable BSC 404 to transmit and receive packets compatible with network 402.

Network 402 is coupled, inter alia, to a first session initiation protocol (SIP) telephone 412, that is able to receive and make SIP calls via network 402, according to a transfer protocol defined in Request for Comments (RFC) 3261 and updates to RFC 3261, published by the Network Working Group of the Internet Society. RFC 3261 may be found at ftp://ftp.rfc-editor.org/in-notes/rfc3261.txt.

Console 52 includes SIP circuitry 420 that enables the console to act as SIP gateway. Console 52 is also coupled to a PSTN telephone 418, substantially as described above with reference to FIG. 3 for telephone 170 or with reference to FIG. 5 for telephone 270. Thus, calls may be made between cellular telephone 60 and SIP telephone 412, or between PSTN phone 418 and SIP telephone 412. Alternatively or additionally, SIP circuitry 420 is configured to communicate with a second SIP telephone 422 located in proximity to console 52, in which case SIP calls may be placed via the console from telephone 422. Further alternatively or additionally, PSTN telephone 410 may be implemented to make and receive SIP calls.

Figure 9:
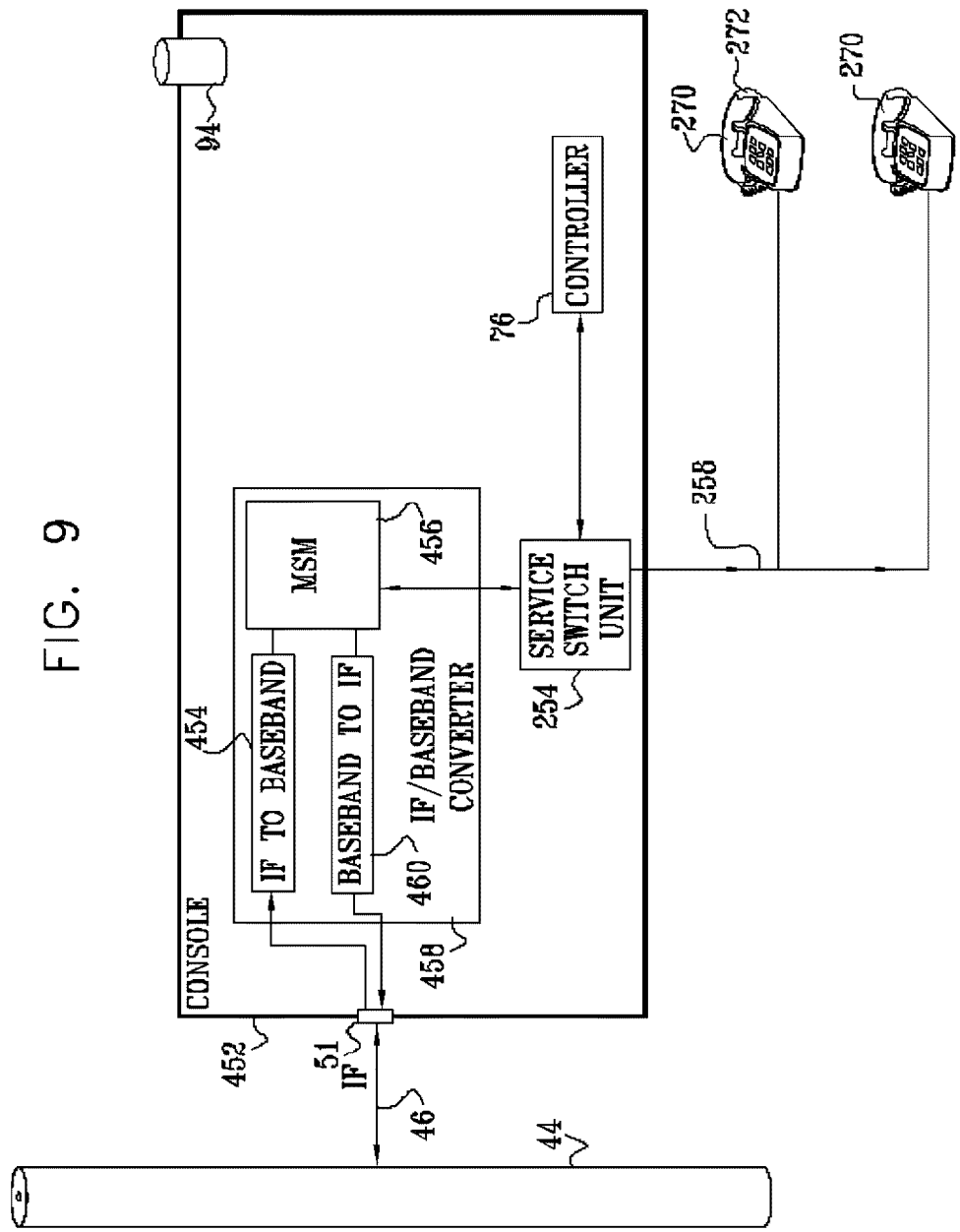
FIG. 9 is a schematic diagram illustrating a console, according to an alternative preferred embodiment of the present invention.

FIG. 9 is a schematic diagram illustrating a console 452, according to an embodiment of the disclosed method and apparatus. Apart from the differences described below, the operation and implementation of console 452 is generally similar to that of console 252 (FIG. 5), such that elements indicated by the same reference numerals in both consoles 252 and 452 are generally identical in construction and in operation. Most preferably, console 452 does not include converter 72 or docking receptacle 79. Optionally, console 452 may include converter 72 and docking receptacle 79, which operate substantially as described above with reference to FIG. 1 and FIG. 2.

Console 452 comprises IF-baseband converter circuitry 458. Circuitry 458 comprises an IF to baseband converter 454 which is able to convert the downstream IF cellular signals received from CATV network interface 51 directly to downstream baseband signals. Circuitry 458 also comprises a baseband to IF converter 460 which converts upstream baseband signals to upstream IF cellular signals. Converters 454 and 460 are coupled to a mobile site modem (MSM) 456 which in turn is coupled to service switch unit 254. Converters 454 and 460, and modem 456, are known in the art. Preferably, console 452 comprises loudspeaker/microphone 96 and keypad 98 (FIG. 2) which act as baseband transceivers. Alternatively or additionally, MSM 456 is coupled via service switch unit 254 to other components that act as baseband transceivers, such as telephones 270. Thus, circuitry 458 enables the console to operate as a stand-alone cellular telephone.

Optionally, console 452 comprises antenna 94, that enables the console to operate as a wireless telephone communicating with an extension phone 78, generally as described above with reference to FIG. 2.

It will be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof.

I claim:

1. An apparatus for reducing electromagnetic radiation from cellular telephones, comprising:
    a cellular telephone interface configured to be communicatively coupled to a cable television (CATV) network and further configured to couple with a cellular telephone such that the cellular telephone is communicatively coupleable to the CATV network;
    wherein when a cellular telephone is coupled with the interface, the cellular telephone may communicate with at least one network element in a cellular network over the CATV network with at least reduced Radio Frequency (RF) cellular signal radiation compared to a direct cellular RF communication with the at least one network element in the cellular network.

2. The apparatus of claim 1, further comprising:
    a base-station transceiver system (BTS) frequency converter coupleable to the at least one network element wherein the network element is at least one base-station transceiver system (BTS) and the cable television (CATV) network, wherein the converter is configured to enable communication from the cellular telephone to the at least one BTS via the CATV network.

3. The apparatus of claim 2 wherein the base-station transceiver system (BTS) frequency converter and cellular telephone interface are configured to be coupled to the cable television (CATV) network by any cabling method known in the art, such as coaxial cable and/or fiber optic cable, or a combination thereof.

4. The apparatus of claim 2, wherein the base-station transceiver system (BTS) frequency converter is configured to convert upstream and downstream Intermediate Frequency (IF) signals to and from radio-frequency (RF) cellular signals.

5. The apparatus of claim 4, wherein the intermediate frequency (IF) signals are selected such that they do not interfere with other service signals transmitted over the cable television CATV network.

6. The apparatus of claim 5 further comprising a system controller coupled to the base-station transceiver system (BTS) frequency converter and configured to select the Intermediate Frequency signals.

7. The apparatus of claim 1, wherein the cellular telephone interface comprises an (Intermediate Frequency) IF diplexer, one or more local oscillators, and a (Radio Frequency) RF diplexer.

8. The apparatus of claim 7, wherein the cellular telephone interface further comprises a docking receptacle coupled to the Radio Frequency (RF) diplexer, which transmits the Radio Frequency (RF) upstream cellular signals to the diplexer, and receives the Radio Frequency (RF) downstream signals from the diplexer.

9. The apparatus of claim 8 wherein the docking receptacle is configured to accept a cellular telephone.

10. The apparatus of claim 1, wherein the cellular telephone interface is further configured to communicatively couple with an extension telephone that acts as a cordless phone communicating with the console by a protocol known in the art, such as a cordless telephone protocol, a Bluetooth protocol, or an IEEE 802.11 protocol.

11. A method for reducing electromagnetic radiation from cellular telephones, comprising:
    coupling at least one cellular telephone with a cable television (CATV) network without RF cellular signal radiation with a cellular telephone interface; and
    communicatively coupling the cellular telephone interface and at least one network element in a cellular network over the CATV network, such that communication between the at least one cellular telephone and the at least one network element is operable with reduced Radio Frequency (RF) cellular signal radiation compared to a direct cellular RF communication with the at least one network element in the cellular network.

12. The method of claim 11, further comprising:
    coupling the at least one cellular telephone to the at least one network element through a base-station transceiver system (BTS) frequency converter coupleable to the at least one network element wherein the network element is at least one base-station transceiver system (BTS) and the cable television (CATV) network, wherein the converter is configured to enable communication from the cellular telephone to the at least one BTS via the CATV network.

13. The method of claim 1 wherein the base-station transceiver system (BTS) frequency converter and cellular telephone interface are configured to be coupled to the cable television (CATV) network by any cabling method known in the art, such as coaxial cable and/or fiber optic cable, or a combination thereof.

14. The method of claim 1, wherein the base-station transceiver system (BTS) frequency converter is configured to convert upstream and downstream Intermediate Frequency (IF) signals to and from radio-frequency (RF) cellular signals.

15. The method of claim 14, further comprising:
selecting the intermediate frequency (IF) signals such that they do not interfere with other service signals transmitted over the cable television CATV network.

16. The method of claim 15 wherein selection of the IF signals is performed with a system controller coupled to the base-station transceiver system (BTS) frequency converter and configured to select the Intermediate Frequency signals.

17. The method of claim 11, wherein the cellular telephone interface comprises an (Intermediate Frequency) IF diplexer, one or more local oscillators, and a (Radio Frequency) RF diplexer.

18. The method of claim 7, wherein the cellular telephone interface further comprises a docking receptacle coupled to the Radio Frequency (RF) diplexer, which transmits the Radio Frequency (RF) upstream cellular signals to the diplexer, and receives the Radio Frequency (RF) downstream signals from the diplexer.

19. The method of claim 18 wherein the docking receptacle is configured to accept a cellular telephone.

20. The method of claim 11, wherein the cellular telephone interface is further configured to communicatively couple with an extension telephone that acts as a cordless phone communicating with the console by a protocol known in the art, such as a cordless telephone protocol, a Bluetooth protocol, or an IEEE 802.11 protocol.

\* \* \* \* \*